(12) United States Patent
Schilling

(10) Patent No.: US 12,314,686 B2
(45) Date of Patent: May 27, 2025

(54) METHOD AND VALIDATION SYSTEM FOR VALIDATING A SOFTWARE COMPONENT FOR HIGHLY AUTOMATED DRIVING

(71) Applicant: Robert Bosch GmbH, Stuttgart (DE)

(72) Inventor: Christian Schilling, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 18/337,167

(22) Filed: Jun. 19, 2023

(65) Prior Publication Data
US 2023/0418561 A1 Dec. 28, 2023

(30) Foreign Application Priority Data
Jun. 23, 2022 (DE) ...................... 10 2022 206 326.0

(51) Int. Cl.
*G06F 8/10* (2018.01)

(52) U.S. Cl.
CPC ...................... *G06F 8/10* (2013.01)

(58) Field of Classification Search
CPC ........................................................ G06F 8/10
USPC .................................. 717/105–140, 168–174
See application file for complete search history.

(56) References Cited

U.S. PATENT DOCUMENTS

| | | | | |
|---|---|---|---|---|
| 6,080,207 A * | 6/2000 | Kroening | ................... | G06F 8/63 |
| | | | | 717/172 |
| 7,330,967 B1 * | 2/2008 | Pujare | ................... | G06F 9/4411 |
| | | | | 717/170 |
| 7,813,822 B1 * | 10/2010 | Hoffberg | ................ | H04N 7/163 |
| | | | | 381/73.1 |
| 10,007,675 B2 * | 6/2018 | Marti | ................... | G06F 16/2365 |
| 10,102,687 B1 * | 10/2018 | Sampigethaya | ....... | G06Q 50/40 |
| 10,479,303 B2 * | 11/2019 | Koehler | ................ | G07C 5/008 |
| 11,039,737 B2 * | 6/2021 | Kohler | ............... | A61B 1/00105 |

(Continued)

OTHER PUBLICATIONS

Rajabali et al, "Software Verification and Validation of Safe Autonomous Cars: A Systematic Literature Review", IEEE, pp. 4797-4819 (Year: 2023).*

(Continued)

*Primary Examiner* — Anil Khatri
(74) *Attorney, Agent, or Firm* — Maginot, Moore & Beck LLP

(57) ABSTRACT

A method for validating a software component for highly automated driving is disclosed, wherein unprocessed video data, which depict at least one driving situation recorded from a vehicle perspective by a recording vehicle are read by a data processing system and processed into preprocessed video data using a vehicle processor connected to the data processing system for video preprocessing, wherein the vehicle processor is arranged on an adapter board and is connected to the data processing system via standard interfaces, wherein the preprocessed video data are used by the data processing system as input variables for the software component to be validated, and a reaction of the software component to the driving situation depicted in the preprocessed video data as output variables for the software component to be validated are compared by the data processing system with an expected reaction in order to validate the software component.

10 Claims, 1 Drawing Sheet

(56) References Cited

U.S. PATENT DOCUMENTS

| | | | | |
|---|---|---|---|---|
| 11,640,467 B2* | 5/2023 | Zarakas | ................. | G06F 21/86 |
| | | | | 713/1 |
| 11,681,811 B1* | 6/2023 | Dixit | ........................ | G06F 8/65 |
| | | | | 726/25 |
| 12,182,694 B2* | 12/2024 | Farabet | ................. | G06V 10/82 |
| 2017/0178498 A1* | 6/2017 | Mcerlean | ............... | G08G 1/166 |
| 2023/0393833 A1* | 12/2023 | Cain, Jr. | ............... | H04L 9/3247 |

OTHER PUBLICATIONS

Schmidt et al, "Methods for Virtual Validation of Automotive Powertrain Systems in Terms of Vehicle Drivability—A Systematic Literature Review", IEEE, pp. 27043-27065 (Year: 2023).*

Rajbali et al, "Software Verification and Validation of Safe Autonomous Cars: A Systematic Literature Review", IEEE, pp. 1-23 (Year: 2020).*

Venkitachalam et al, "Metrics for Verification and Validation of Architecture in Powertrain Software Development", ACM pp. 1-7 (Year: 2015).*

Ghammam et al, "Efficient Management of Containers for Software Defined Vehicles", ACM, pp. 1-36 (Year: 2024).*

Siebinga et al, "A Human Factors Approach to Validating Driver Models for Interaction-aware Automated Vehicles", ACM, pp. 1-21 (Year: 2022).*

* cited by examiner

METHOD AND VALIDATION SYSTEM FOR VALIDATING A SOFTWARE COMPONENT FOR HIGHLY AUTOMATED DRIVING

This application claims priority under 35 U.S.C. § 119 to patent application number 10 2022 206 326.0, filed on Jun. 23, 2023 in Germany, the disclosure of which is incorporated herein by reference in its entirety.

The disclosure relates to a method for validating a software component for highly automated driving, a corresponding validation system, and a corresponding computer program product.

BACKGROUND

For highly automated driving of a vehicle, software components are required that generate control signals for the vehicle depending on the situation. Before the vehicle can participate in road traffic using these software components, a validation of the software components is required. Recorded driving situations are in this case played back to a software component to be validated, and reactions of the software component are compared with expected reactions in order to detect any incorrect reactions.

In order for the software component to interpret the driving situations, computationally intensive preprocessing is required, especially for video data. This preprocessing can be performed in a reasonable time only by specialized hardware of the vehicle. Preprocessing can therefore already take place when recording the driving situations in the vehicle. Recording the preprocessed driving situation requires a large storage capacity.

Alternatively, the vehicle can be connected in the laboratory, recorded sensor data can be input into the vehicle, and control signals can be read from the vehicle. This approach is material-intensive.

SUMMARY

Against this background, the approach presented herein introduces a method for validating a software component for highly automated driving, a corresponding validation system, and a corresponding computer program product according to the disclosure. Advantageous embodiments of and improvements to the approach presented herein will follow from the description and are described in the disclosure.

When preprocessed sensor data of driving situations are recorded, the recapture of driving situations, preprocessing of sensor data, and recording of preprocessed sensor data are required when a hardware being used is changed. If the preprocessing is performed while playing back unprocessed sensor data, the complete vehicle is required, although the preprocessing is performed only by the specialized hardware in the vehicle, and significant parts of the vehicle are not used during the validation.

In the approach presented herein, the specialized hardware, in particular a vehicle processor, is transferred from the vehicle to a computer system in the laboratory. The rest of the vehicle is then not needed. For integration into the computer system, the hardware is placed on a specially configured adapter board and accessed by the computer system via standard interfaces. The hardware performs preprocessing of unprocessed sensor data and returns preprocessed sensor data to the computer system. The software component being validated is executed on the computer system and its reactions are evaluated.

The approach presented herein enables preprocessing to be performed using the current hardware in each case. Since only the specialized hardware is used, material usage can be minimized. Due to the hardware acceleration of the specialized hardware, the validation can be done in a short period of time.

A method for validating a software component for highly automated driving is proposed, whereby unprocessed video data, which depict at least one driving situation recorded from a vehicle perspective of a recording vehicle, are read by a data processing system and processed into preprocessed video data using a vehicle processor for video preprocessing (PiL) connected to the data processing system, the vehicle processor being arranged on an adapter board and being connected to the data processing system via standard interfaces, the preprocessed video data being used by the data processing system as input variables for the software component to be validated, and a reaction of the software component to the driving situation depicted in the preprocessed video data as output variables for the software component to be validated are compared by the data processing system with an expected reaction in order to validate the software component.

Further presented is an adapter board for video preprocessing of unprocessed video data on a vehicle processor, whereby the unprocessed video data depict at least one driving situation recorded from a vehicle perspective of a recording vehicle, the adapter board comprising at least the one vehicle processor for preprocessing unprocessed video data into preprocessed video data and at least one standard interface for the video data.

Also presented is an operating system for operating a vehicle processor for the video preprocessing of unprocessed video data on an adapter board, whereby the unprocessed video data depict at least one driving situation recorded from a vehicle perspective of a recording vehicle, the operating system comprising a reading routine for reading the unprocessed video data from a data processing system via a standard interface of the adapter board, a forwarding routine for bit-accurate and deterministic forwarding of the unprocessed video data to the vehicle processor, an acceptance routine for bit-accurate and deterministic acceptance of preprocessed video data from the vehicle processor, and a provisioning routine for providing the preprocessed video data to the data processing system via the standard interface.

An operating system for operating an adapter board for video preprocessing of unprocessed video data on a vehicle processor is further presented, the unprocessed video data depicting at least a driving situation recorded from a vehicle perspective of a recording vehicle, the operating system comprising a provisioning routine for providing the unprocessed video data to the adapter board via a standard interface of a data processing system and a reading routine for reading preprocessed video data from the adapter board via the standard interface.

Ideas concerning embodiments of the present disclosure can be considered to be based on, among other things, the ideas and findings described hereinafter.

A software component can be a computer program product. The software component can be designed to control at least one function of a vehicle in a highly automated manner. For example, the software component can plan a trajectory of the vehicle depending on a current driving situation and control the vehicle to drive on this trajectory.

The software component can be validated by checking its function or its reactions to different driving situations. The reactions can deviate from predefined expected reactions by a maximum of one error tolerance. The reactions can, e.g., be depicted in output control signals.

A driving situation can be a situation during a journey of a vehicle. The driving situation can involve fixed as well as moving objects in an environment of the vehicle. The driving situation can therefore involve infrastructure, obstacles and other road users. The driving situation can include relative movements between the contained objects and the vehicle. The driving situation can also include a movement of the ego vehicle. Instantaneous kinematics of the vehicle can be contained in the driving situation due to the relative motion of the fixed objects to the vehicle. The kinematics of the vehicle can also be contained in the driving situation by kinematic data acquired elsewhere.

The video data can be moving image information. The video data can have been captured by at least one video camera. The video camera can have captured the driving situation. The captured video data can have been stored on a storage medium without preprocessing. The video data can have been recorded in the past. The video data can have been recorded using a special recording vehicle. However, the video data can also be recordings from a fleet of vehicles. A vehicle perspective can depict the driving situation from a perspective of the vehicle comprising the software component.

A data processing system can be a computer system. In particular, the data processing system can be located in a laboratory. The data processing system can be referred to as a server system.

A vehicle processor for video preprocessing can be a specialized processor designed for the use case of preprocessing video data. The vehicle processor can preprocess video data many times faster than a data processing system processor. The vehicle processor can normally be installed in a vehicle. In a vehicle, the vehicle processor can be directly connected to at least one video camera of the vehicle. The vehicle processor can preprocess the video data in real time.

The adapter board enables the vehicle processor to be controlled by the data processing system. The adapter board enables data exchange between the data processing system and the vehicle processor via standard interfaces. The adapter board also features a vehicle interface to the vehicle processor. The adapter board comprises no superfluous components. An operating system is run on the adapter board or on the vehicle processor, which operating system orchestrates the exchange of data with the data processing system.

A standard interface can be one commonly used in a computer system. The standard interface can be standardized, and at least one standard interface can, e.g., be arranged in a slot of the data processing system. The adapter board can be plugged into the slot and thus connected via the standard interface.

An operating system for operating the vehicle processor can be run on the adapter board. The operating system can be installed on the adapter board. Alternatively, the operating system for operating the vehicle processor can also be executed on the vehicle processor. An operating system for operating the adapter board can be run on the data processing system.

The operating systems can comprise routines which are depicted in program code. These routines can describe data management. For example, the routines can access data registers of the data processing system, the adapter board, and/or the vehicle processor. The routines can also describe a data transmission via the standard interfaces.

A provisioning routine can control a provisioning of the unprocessed video data or preprocessed video data in a form and at a rate able to be transmitted via the standard interface. A reading routine can be a counterpart to the provisioning routine. The reading routine can control a reading of the unprocessed video data or preprocessed video data in a form and speed that able to be transferred via the standard interface.

A forwarding routine can control a forwarding of the unprocessed video data in a form and speed intended for the vehicle processor. An acceptance routine can control an acceptance of the preprocessed video data in the form and speed intended for the vehicle processor.

The operating systems can be programmed as a coherent computer program product. When uploading to the data processing system, adapter board, and/or vehicle processor, applicable routines can be activated, whereas non-applicable routines are not. The operating system can be a Linux operating system.

Using the vehicle processor, an optical flow of the video data can be calculated. The optical flow can be embedded in the preprocessed video data. A calculation of the optical flow of video data can be very computationally intensive. The vehicle processor can calculate the optical flow in a short period of time. By calculating the optical flow in the vehicle processor, the validation of the software component can be performed at a high speed.

Using the vehicle processor, depth information can be calculated from the video data. The depth information can be embedded in the preprocessed video data. A calculation of depth information in video data can be very computationally intensive. The vehicle processor can calculate depth information in a short period of time.

Using the vehicle processor, the unprocessed video data can be rectified. The rectification of video data can be very computationally intensive. The vehicle processor can rectify the video data in a short period of time.

Progress information can be read by the software component. Control signals can be generated using the progress information. The unprocessed video data can be transferred to the vehicle processor step by step in response to the control signals. Alternatively or complementarily, the preprocessed video data can be provided to the software component step-by-step in response to the control signals. A processing speed of the vehicle processor can be specified by the software component. The progress information can specify a clocking of the preprocessing, and the step-by-step preprocessing can eliminate the need for intermediate storage of the preprocessed video data. The progress information can be read and processed by at least one of the operating systems. The routines of the operating systems can be synchronized by the control signals.

The operating system for operating the adapter board can comprise a control routine for providing control signals to the adapter board via another standard interface of the data processing system. The control routine can be designed to read progress information from the software component and generate the control signals using the progress information. The forwarding routine executed on the adapter board can be designed to forward the unprocessed video data step by step to the vehicle processor in response to the control signals read from the data processing system via the further standard interface of the adapter board. The acceptance routine can be designed to receive the preprocessed video data step-by-step from the vehicle processor in response to the control signals.

The unprocessed video data can be forwarded to the adapter board in bulk. Said bulk can be a data package. For example, a bulk can have a predetermined number of frames or a predefined duration. By processing the video data in bulk, the vehicle processor can be operated at full capacity. The provisioning routines and reading routines can control the bulkwise transfer.

At least one of the standard interfaces can be designed as a data interface. In particular, the data interface can be designed as a PCIe interface. A data interface can be configured for high data throughput. The unprocessed video data are already very large. Preprocessing can still increase a data amount of preprocessed video data. The video data can be transmitted in real time via the data interface. The provisioning routines and reading routines can be configured for the data interface. The PCIe interface can be used to transfer the unprocessed video data and to transfer the preprocessed video data.

At least one of the standard interfaces can be designed as a control interface. In particular, the control interface can be designed as an Ethernet interface. The Ethernet interface can be accessed in order to transmit the control signals. A control interface can feature a robust communication protocol. The control signals can be transmitted without loss via the control interface.

The vehicle processor can be interchangeable. For example, if an improved vehicle processor is available, the adapter board can be updated. Likewise, the vehicle processor can be replaced in the event of a defect.

The operating systems can be updated. New operating systems can be installed on the data processing system, the adapter board, and/or the vehicle processor.

The adapter board can comprise operating means for operating the vehicle processor. The operating means can be tuned according to minimal requirements of the vehicle processor. The operating system for operating the vehicle processor can be run on the operating means. The operating means can, e.g., comprise data registers.

The adapter board can be provided without a cooling means. Temperatures in the data processing system are much lower than those possible in the vehicle. The adapter board can be simple in design. It is not necessary to design the adapter board for the extreme conditions in the vehicle. The vehicle processor can be cooled by a fan of the data processing system.

The method is preferably computer-implemented and can, e.g., be implemented in software or hardware form, or in a mixed form of software and hardware, e.g. in a control unit.

The approach presented herein also creates a validation system for validating a software component for highly automated driving, which is designed to perform, control, or implement the steps of a variant of the method presented here in corresponding means. The validation system comprises a data processing system and at least one adapter board according to the approach presented herein.

A computer program product or a computer program comprising program code that can be stored on a machine-readable carrier or storage medium, e.g., a semiconductor memory, a hard disk memory or an optical memory and can be used for performing, implementing and/or controlling the steps of the method according to one of the embodiments described hereinabove is advantageous as well, in particular when the program product or program is performed on a computer or a device.

It should be noted that some of the possible features and advantages of the disclosure are described herein with reference to various embodiments. The skilled person will recognize that the features of the control unit and the method can be suitably combined, adapted, or interchanged in order to arrive at further embodiments of the disclosure.

BRIEF DESCRIPTION OF THE DRAWINGS

Embodiments of the disclosure are described hereinafter with reference to the accompanying drawing, whereby neither the drawing nor the description are to be construed as limiting the disclosure.

Figure 1:
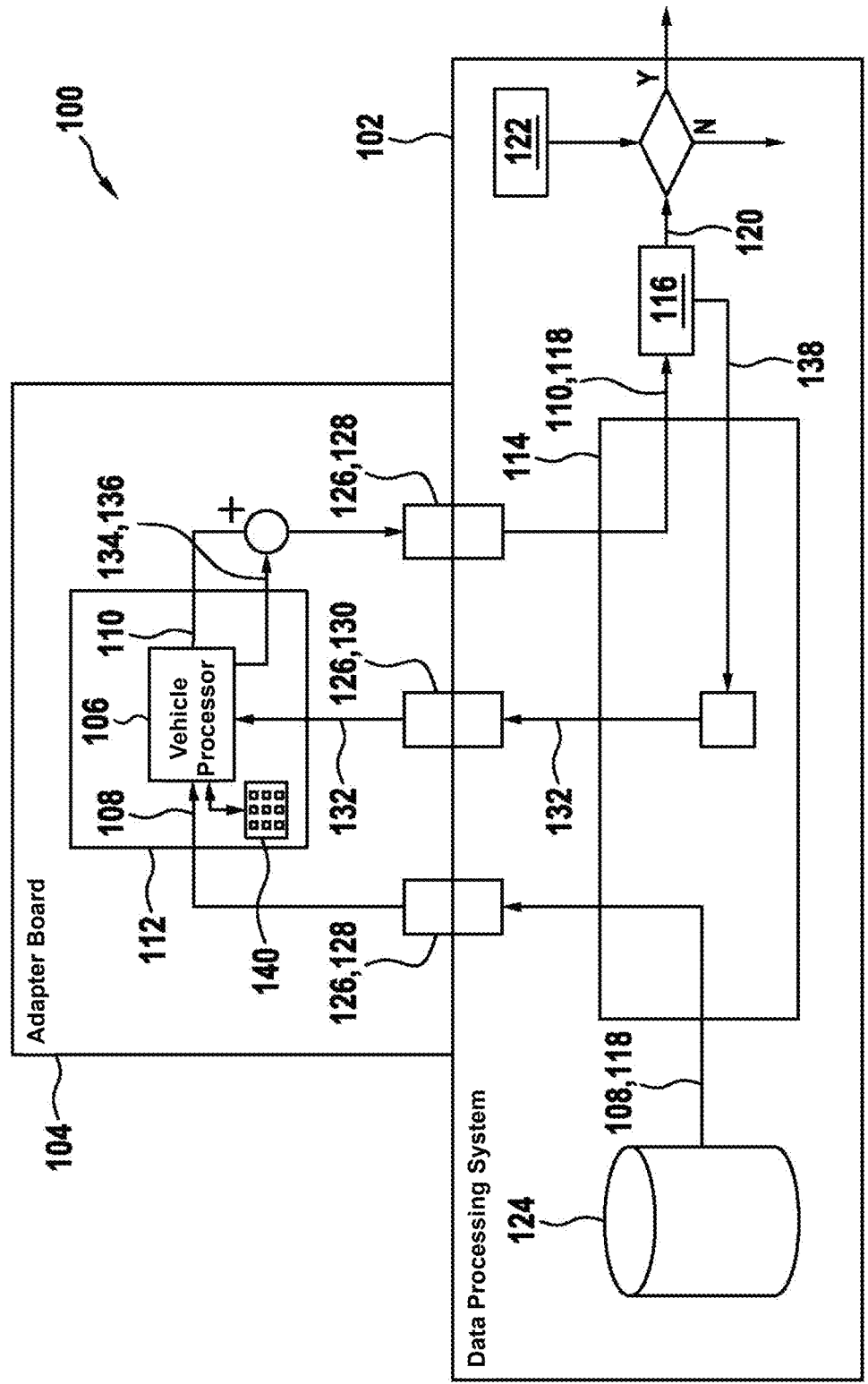
FIG. 1 shows an illustration of a validation system according to one embodiment.

This drawing is only schematic and not to scale. Identical reference signs denote identical or identically acting features.

DETAILED DESCRIPTION

FIG. 1 shows an illustration of a validation system 100 according to one embodiment. The validation system 100 comprises a data processing system 102 and at least one vehicle processor 106 connected to the data processing system 102 via an adapter board 104 for preprocessing unprocessed video data 108 into preprocessed video data 110. Similar vehicle processors can be installed in highly automated vehicles in order to preprocess unprocessed video data from vehicle video sensors for subsequent use. An operating system 112 for operating the vehicle processor 106 is installed on the adapter board 104 or the vehicle processor. An appropriate operating system 114 is installed on the data processing system 102 for operating the adapter board 104. The operating systems 112, 114 can also be referred to as drivers for the adapter board 104 or the vehicle processor 106. In one embodiment, the operating systems 112, 114 are based on the Linux operating system.

The validation system 100 is configured to validate a software component 116 for highly automated vehicles. Validation can be referred to as recomputing. Validation can be performed in the laboratory. For this purpose, the software component 116 is performed on the data processing system 102, and the preprocessed video data 110 from various stored driving situations 118 are provided by the data processing system 102 to the software component 116 as input variables. The reactions 120 of the software component 116 to the driving situations 118 depicted as output variables of the software component 116 are evaluated by the data processing system 102 in order to validate the software component 116. The reactions 120 are in this case compared to expected reactions 122 and an intended function of the software component 116 is detected if the reactions 120 substantially match the expected reactions 122.

In the approach presented herein, the data processing system 102 is a server system constructed from standard processors and standard components and assembled in a laboratory environment. The video data are read by the data processing system 102 unprocessed or as raw data from a storage medium 124, e.g. at least one hard disk, and transferred to the vehicle processor 106. This transfer is controlled by the corresponding operating systems 112, 114. The vehicle processor 106 processes the unprocessed video data 108 into the preprocessed video data 110, and feeds the preprocessed video data 110 back to the data processing system 102. The preprocessed video data 110 is then fed to the software component 110 as the input variables. The transfer is again controlled by the respective operating systems 112, 114.

The unprocessed video data 108 has been recorded by at least one recording vehicle during actual driving situations from a vehicle perspective and has been stored on the storage medium 124 in order to be able to use the same driving situations multiple times for validation, e.g., if a development status of the software component 116 changes.

The adapter board 104 is connected to the data processing system 102 via standard interfaces 126. The unprocessed video data 108 and the preprocessed video data 110 are in this case exchanged via a high-speed data interface 128, e.g. a PCIe interface. Control signals 132 are transmitted via a control interface 130, e.g. an Ethernet interface, in order to control the vehicle processor 106.

In one embodiment, an optical flow 134 of the unprocessed video data 108 is calculated using the vehicle processor 106. The video data are enriched with optical flow 134 in order to form preprocessed video data 110. Enriching the video data increases a data volume of the video data.

In one embodiment, depth information 136 is calculated from the unprocessed video data 108 using the vehicle processor 106. The depth information 136 is embedded in the video data.

In one embodiment, a progress of the software component 116 is monitored and the preprocessing on the vehicle processor 106 is synchronized with the progress. Progress information 138 representing progress is for this purpose read by the software component 116, and control signals 132 for the vehicle processor 106 are generated using the progress information 138. Doing so enables the vehicle processor 106 to be controlled step-by-step.

In one embodiment, the vehicle processor 106 is socketed and thus interchangeable.

In one embodiment, operating means 140 for operating the vehicle processor 106 are arranged on the adapter board 104. The operating means 140 are, e.g., data registers accessed by the operating system 112 to control the delivery of the unprocessed video data 108 and preprocessed video data 110 in a bit-accurate and deterministic manner.

In one embodiment, the adapter board 104 does not comprise a cooler for the vehicle processor 106. By eliminating the cooler, the adapter board can be plugged into a standard slot of the data processing system 102.

In the following, possible embodiments of the disclosure are again summarized or presented using a slightly different choice of words.

A Processor in the Loop (PiL) for video data preprocessing in recomputing is presented.

The approach presented herein relates to video data preprocessing in the context of a software open loop (SoL) test platform for highly automated driving.

When testing and releasing components for highly automated driving, large real data sets (recorded in the vehicle) from the sensors, covering various driving situations and environments, are subsequently played back on the software side in order to be able to ensure the function of the software components during development. This should be performed within a reasonable testing time. Especially with video sensors such as the SVC, the recorded data volumes are very large. In addition, these sensors require special hardware in the vehicle for data preprocessing, e.g., the calculation of optical flow and depth information, in order to achieve the time targets. These preprocessing procedures further enrich and magnify the data. This procedure can in the vehicle lead to problems in recomputing.

On the one hand, there is the possibility of recording the preprocessed data in the vehicle and then playing it back in the recomputing. The actual hardware of the vehicle can then be used and no further effort is required. However, the amount of data to be stored is large, which means that correspondingly expensive memory is required. If the hardware and embedded software evolve or bugs are fixed, then previously recorded data can no longer be used, and it becomes necessary to record new driving situations, which can lead to increased effort and the loss of important tests in very rare situations.

On the other hand, there is the option of installing the hardware from the vehicle in a HoL (hardware open loop) approach in data centers. The raw data from the sensors are then recorded in the car itself and can be processed independently in the data center. Doing so has the advantage that changes to hardware and software can be depicted and data are not lost. However, the storage overhead remains and larger amounts of hardware are required to be installed and accessed in appropriately designed data centers. Doing so can be very expensive, especially in release scenarios in which several thousand hours of video need to be processed as quickly as possible.

Another option is to implement the preprocessing in software on standard CPUs. Doing so eliminates the need for storage, since orchestration in the software-open-loop (SoL) context is possible on the software side. In addition, updated software versions can be used again and again. However, image processing is much slower (about 1000 times) on hardware not specifically designed for this purpose, making the solution impractical for large amounts of data for software release.

We present herein a system that combines the advantages from the above possibilities and can also be used and orchestrated directly in a SoL recomputing process. The PiL (Processor in the Loop) is introduced. The PiL is a lightweight hardware developed specifically for recomputing, with corresponding simulation software, which incorporates the central chip of the vehicle hardware, but can be accessed by software in the simulation context and installed in standard servers using standard interfaces. Doing so eliminates the need to store preprocessed data, since the central chip is used as in the vehicle. Software changes can be tracked in the simulation and important raw data can be used in the long term to approve vehicle functions. In addition, the approach with the servers is scalable.

SoL/SiL systems have thus far been used which enable software-based recomputation or simulation or HoL/HiL systems that play the software under test with the concretely developed hardware installed in the vehicle as a basis. Both approaches have certain advantages and disadvantages in terms of realism, speed, cost, and effort. These advantages and disadvantages can and are mitigated by optimized methods and optimizations, but they remain. The approach presented herein is an optimization that combines the best of both worlds and focuses on the benefits. A similar lightweight approach does not yet exist.

The approach presented herein provides the opportunity to make specialized hardware for special purposes, such as image preprocessing of an SVC in a highly automated vehicle, available in a lightweight way in a software-supported resimulation/recomputation process, thereby accelerating it. Using standard hardware (CPU, GPU), these special tasks cannot be completed in a reasonable time frame. Only specialized hardware, some of which has been developed in-house, can do this. However, the use of the hardware, which is also installed in the vehicle, is very expensive, since entire circuit boards are used, which install a few more components around the specialized chip, but which are not necessarily needed in recomputing. In addition, special HoL systems are then required that can access and orchestrate this hardware as in the vehicle.

The PiL approach, on the other hand, is to put the specialized chip on a simple board that can be installed in a server using a standard server interface (such as PCIe or Ethernet). This server can then be integrated into and accessed in a cluster of SiL/SoL systems. Doing so makes it possible to also use, orchestrate, and scale the specialized hardware by means of software that performs recompute tests.

A combination of a lightweight board with a specialized chip and a server interface for use in SiL/SoL systems is presented, as well as the necessary hardware-based simulation software that enables the orchestration of preprocessing in recomputing. Doing so enables the advantages of the specialized chip (hardware acceleration, proximity to real-world use) to be combined with the advantages of software-based recomputing (flexibility, large data volumes, low cost). In addition, the advantage remains that changes to the hardware and simulation software can be depicted, and old data recorded in the vehicle can be retained in recomputing. Rare driving situations in particular are valuable thereby. Since the board is also very inexpensive compared to the control unit, the approach presented herein can also be scaled very well in terms of a software simulation.

The PiL approach presented herein is used to provide specialized hardware chips for data preprocessing in a software-based recomputing in a server network. For this purpose, the PiL consists of a lightweight, small circuit board, which incorporates the specialized chip. The chip itself contains a software interface that understands control signals and can accept data. On the other hand, these signals and data are controlled and played back step-by-step by the recomputing software via a gateway. The data and control signal interfaces on the hardware side are each designed for the expected transmission rates. Therefore, a fast PCIe connection can be selected for data transmission and an Ethernet connection for the control signals. However, other standard interfaces are also possible. The gateway is in turn directly accessed by the recomputing software. The data being preprocessed are in this case transferred step-by-step or in bulk, and the process of preprocessing is monitored. The resulting data are then returned directly to the recomputing software, which can further import the data into the actual system under test. The setup of the chain and the necessary components can be fully automated and monitored using appropriate high-level tools such as Ansible. This can also be used to roll out and exchange different versions of the preprocessing software available in the cluster.

The approach presented herein uses a lightweight board with preprocessing hardware to preprocess large video sequences and simulation software in a server cluster to recompute highly automated driving components.

Finally, it should be noted that terms such as "comprising", "including", etc. do not exclude other elements or steps, and terms such as "one" or "a" do not exclude a plurality.

The invention claimed is:

1. A method for validating a software component for highly automated driving, comprising:
    reading with a data processing system unprocessed video data which depict at least one driving situation recorded from a vehicle perspective by a recording vehicle, the data processing system being outside of the recording vehicle;
    processing the unprocessed video data into preprocessed video data using a vehicle processor connected to the data processing system for video preprocessing, wherein the vehicle processor is arranged on an adapter board, the adapter board being outside of the recording vehicle and connected to the data processing system via at least one interface of the data processing system, wherein the vehicle processor is configured to be installed within a vehicle;
    using, with the data processing system, the preprocessed video data as input variables for the software component; and
    validating the software component with the data processing system by comparing output variables of the software component associated with a reaction of the software component to the recorded at least one driving situation with an expected reaction.

2. The method according to claim 1, the processing further comprising:
    calculating an optical flow of the unprocessed video data using the vehicle processor; and
    embedding the optical flow in the preprocessed video data.

3. The method according to claim 1, the processing further comprising:
    calculating depth information from the video data using the vehicle processor; and
    embedding the depth information in the preprocessed video data.

4. The method according to claim 1, the processing further comprising:
    rectifying, using the vehicle processor, the unprocessed video data.

5. The method according to claim 1, further comprising:
    reading progress information from the software component;
    generating control signals using the progress information; and
    providing at least one of (i) the unprocessed video data or (ii) the preprocessed video data to the vehicle processor step-by-step in response to the control signals.

6. The method according to claim 1, further comprising:
    transferring the unprocessed video data in bulk to the adapter board.

7. The method according to claim 1, wherein the method is performed by executing computer program instructions stored on a non-transitory machine-readable storage medium.

8. The method according to claim 1, wherein the at least one interface of the data processing system includes at least one of a PCIe interface or an Ethernet interface.

9. A validation system for validating a software component for highly automated driving, the validation system comprising:
    a storage device configured to store unprocessed video data which depict at least one driving situation recorded from a vehicle perspective by a recording vehicle;
    a data processing system that is arranged outside of the recording vehicle; and
    an adapter board that is arranged outside of the recording vehicle, the adapter board being connected to the data processing system via at least one interface of the data processing system, a vehicle processor being arranged on the adapter board, the vehicle processor being configured to be installed within a vehicle,
    wherein the data processing system is configured to:

read the unprocessed video data from the storage device;

process the unprocessed video data into preprocessed video data using the vehicle processor that is connected via the adapter board;

use the preprocessed video data as input variables for the software component; and validate the software component by comparing output variables of the software component associated with a reaction of the software component to the recorded at least one driving situation with an expected reaction.

10. The method according to claim 9, wherein the data processing system executes computer program instructions stored on a non-transitory machine-readable storage medium.

* * * * *